(12) United States Patent
Deng

(10) Patent No.: US 10,805,996 B1
(45) Date of Patent: Oct. 13, 2020

(54) DIAL SEGMENTED DIMMING CIRCUIT

(71) Applicant: Jinsheng Deng, Rancho Dominguez, CA (US)

(72) Inventor: Jinsheng Deng, Rancho Dominguez, CA (US)

(73) Assignee: EPC PRODUCT LLC, Rancho Dominguez, CA (US)

( * ) Notice: Subject to any disclaimer, the term of this patent is extended or adjusted under 35 U.S.C. 154(b) by 0 days.

(21) Appl. No.: 16/706,862

(22) Filed: Dec. 9, 2019

(51) Int. Cl.
  *H05B 45/10* (2020.01)
  *H05B 45/325* (2020.01)
  *H02M 1/44* (2007.01)
  *H05B 45/382* (2020.01)

(52) U.S. Cl.
  CPC .............. *H05B 45/10* (2020.01); *H02M 1/44* (2013.01); *H05B 45/325* (2020.01); *H05B 45/382* (2020.01)

(58) Field of Classification Search
  CPC .... H05B 45/10; H05B 45/325; H05B 45/382; H02M 1/44
  See application file for complete search history.

(56) References Cited

U.S. PATENT DOCUMENTS

| 2013/0257695 | A1* | 10/2013 | Hubschneider | H04N 13/122 345/58 |
| 2019/0035569 | A1* | 1/2019 | Sadwick | H01H 9/287 |

FOREIGN PATENT DOCUMENTS

| CN | 106879126 A | * | 6/2017 |
| CN | 106937451 A | * | 7/2017 |
| CN | 209571032 U | * | 11/2019 |

\* cited by examiner

*Primary Examiner* — Raymond R Chai

(57) ABSTRACT

A dial segmented dimming circuit, comprising an AC input terminal, an EMI module, a rectifying module, an input filter module, a transformer, an output filter module and a DC output terminal, and a PWM main control module; the DC output terminal is connected to a LED lamp array module; the AC input terminal is connected to a wall switch, the dial segmented dimming circuit includes a dial segmented dimming module, a rotary switch dimming module and a regulated power supply module; the rotary switch dimming module is connected to the PWM main control module via a photoelectric coupling feedback module; the dial segmented dimming module includes a dial switch control chip and a light intensity dial switch and a power dial switch; the light intensity dial switch and power dial switch are interconnected.

9 Claims, 1 Drawing Sheet

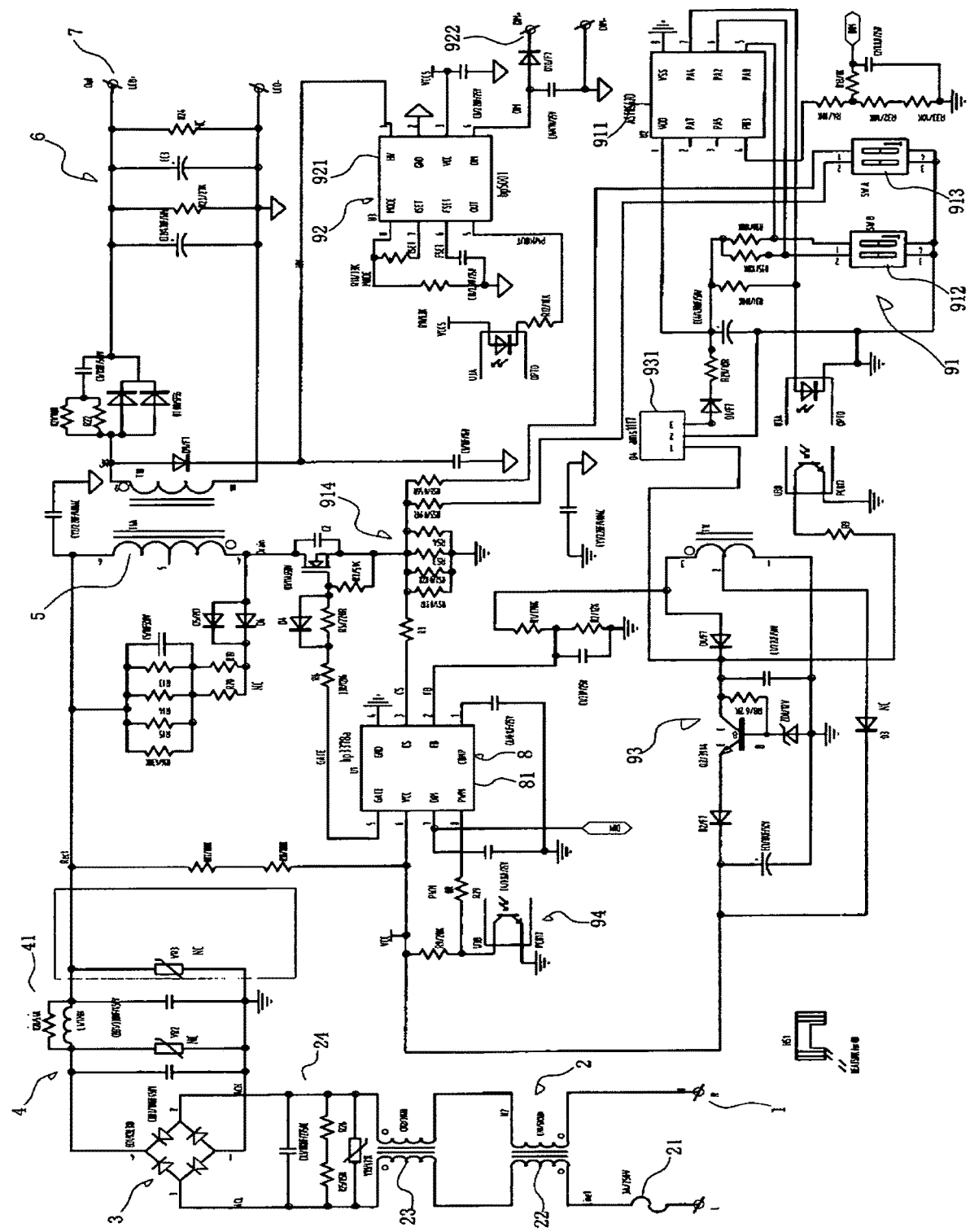

DIAL SEGMENTED DIMMING CIRCUIT

BACKGROUND OF INVENTION

1. Field of the Invention

The present invention relates generally to the technical field of electronic circuit, and more particularly to a dial segmented dimming circuit.

2. Description of Related Art

The Light Emitting Diode (LED) is a solid-state semiconductor device which can convert electric energy into visible light, it can directly convert electricity into light.

At the present stage, the world is seeking for health and environmental protection and the energy crisis is serious, the LED lighting has been globally recognized as a valuable approach to health, energy saving and environmental protection, its application area is being expanded faster. For illuminating lamps, the LED is characterized by environmental protection, long life and low power consumption, so that the LED has substituted the small incandescent bulb and fluorescent lamp gradually. Even so, the light intensity of LED shall be regulated to conform with the environmental requirement, so as to save more energy.

The present dimmer switch has difficult dimming, the segmented dimming cannot be implemented for a conventional LED, and only simple dimming is available, it is very inconvenient.

In view of this, the inventor proposes the following technical proposal.

SUMMARY OF THE INVENTION

The purpose of the present invention is to overcome the shortcomings of the prior art and provide a dial segmented dimming circuit.

In order to solve the above technical problems, the present invention adopts the following technical solutions:

A dial segmented dimming circuit, comprising an AC input terminal, an EMI module, a rectifying module, an input filter module, a transformer, an output filter module and a DC output terminal connected in turn, and a PWM main control module electrically connected to the transformer and output filter module; wherein the DC output terminal is connected to a LED lamp array module; the AC input terminal is connected to a wall switch, wherein the dial segmented dimming circuit includes a dial segmented dimming module, a rotary switch dimming module and a regulated power supply module; the regulated power supply module is connected to the input filter module, primary coil of transformer and dial segmented dimming module; the rotary switch dimming module is connected to the PWM main control module via a photoelectric coupling feedback module; the dial segmented dimming module includes a dial switch control chip and a light intensity dial switch and a power dial switch connected to the dial switch control chip; the light intensity dial switch and power dial switch are interconnected; the power dial switch is connected to a current limiting resistance and to the PWM main control module; the dial switch control chip is connected to the PWM main control module.

More particularly, wherein the rotary switch dimming module includes a rotary switch control chip and a rotary switch connected to the rotary switch control chip; the rotary switch control chip is connected to the photoelectric coupling feedback module.

More particularly, wherein the current limiting resistance includes a plurality of current limiting resistance resistors connected in parallel.

More particularly, wherein the regulated power supply module includes a first transistor, a voltage regulation chip, a first diode, a second diode and a Zener diode; a base of the first transistor is connected to the Zener diode, a collector of the first transistor is connected to the second diode and to the primary coil of transformer and PWM main control module; the collector of the first transistor is connected to the voltage regulation chip; an emitter of the first transistor is connected to the first diode and to the PWM main control module; the first diode is connected to the Zener diode ZD1 through a charging capacitor; the charging capacitor is connected to a first starting resistor and a second starting resistor; the second starting resistor is connected to the input filter module; the voltage regulation chip is connected to the dial segmented dimming module.

More particularly, wherein the EMI module includes a fuse connected to the AC input terminal, a first common mode inductor connected to the fuse, a second common mode inductor connected to the fuse and an RC loop; the RC loop is connected to the rectifying module.

More particularly, wherein the rectifying module has a rectifier bridge chip; the input filter module includes a capacitor CBB2 and a capacitor CBB1 connected in parallel and an RL loop between the capacitor CBB2 and capacitor CBB1.

More particularly, wherein the output filter module includes an electrolytic capacitor EC2, a resistor R23, an electrolytic capacitor EC3 and a resistor R24 connected in parallel and a diode D7 connected to the electrolytic capacitor EC2, a diode D8 connected to both ends of the diode D7 in parallel, a resistor R22 and a capacitor C7 connected to both ends of the diode D7 in parallel, and a resistor R21 connected to both ends of the resistor R22 in parallel; the resistor R21 is connected to the transformer; the resistor R24 is connected to the DC output terminal.

More particularly, wherein the photoelectric coupling feedback module has a photoelectric coupler.

More particularly, wherein the PWM main control module includes a PWM master control chip and a MOS transistor as electronic switch connected to the PWM master control chip; the MOS transistor is connected to the transformer.

In comparison to the existing technology, the present invention has the following benefits. When the present invention is in operation, the AC input terminal contacts the AC voltage, the EMI module filters the noise out of the power grid and power supply. The rectifying module and input filter module transform the AC voltage into DC voltage, which flows to the primary and regulated power supply module of transformer. When the regulated power supply module supplies power to the PWM main control module, dial segmented dimming module and rotary switch dimming module, the overall circuit goes into operation. The light intensity dial switch and power dial switch are used for regulating the light intensity (100%, 60%, 50%, 40%) and power (40 W, 35 W, 30 W, 25 W) respectively. When the dial switch is regulated to 60% light intensity, the wall switch controls 100% and 60% light intensity. In other words, it is 100% light intensity when the wall switch is switched on once, and it is 60% light intensity when it is switched off and switched on once, the light intensity of the other segments can be implemented so forth. When the power supply is switched, the photoelectric coupling feedback module receives voltage, the photoelectric coupling feedback module gives the PWM main control module a high level, the built-in program of PWM main control module gives a signal to the PWM pin of PWM master control chip in the PWM main control module to control the overall voltage and current output, so that the light intensity is regulated by switching. The light intensity can be regulated by controlling the rotary switch dimming module, so as to create a dimming method, it is convenient to use, so that the present invention has very strong marketability.

BRIEF DESCRIPTION OF THE DRAWINGS

FIG. 1 is a circuit diagram of the present invention.

DETAILED DESCRIPTION OF THE INVENTION

The details of the present invention are described with attached FIGURES below.

As shown in FIG. 1, a dial segmented dimming circuit comprises an AC input terminal 1, an EMI module 2, a rectifying module 3, an input filter module 4, a transformer 5, an output filter module 6 and a DC output terminal 7 which are connected in turn and a PWM main control module 8 electrically connected to the transformer 5 and output filter module 6. The DC output terminal 7 is connected to a LED lamp array module. The dial segmented dimming circuit comprises a dial segmented dimming module 91, a rotary switch dimming module 92 and a regulated power supply module 93. The regulated power supply module 93 is connected to the input filter module 4, primary coil of transformer 5 and dial segmented dimming module 91. The rotary switch dimming module 92 is connected to the PWM main control module 8 via a photoelectric coupling feedback module 94. The dial segmented dimming module 91 comprises a dial switch control chip 911 and a light intensity dial switch 912 and a power dial switch 913 connected to the dial switch control chip 911. The light intensity dial switch 912 and power dial switch 913 are interconnected, and the power dial switch 913 is connected to a current limiting resistance 914 and to the PWM main control module 8. The dial switch control chip 911 is connected to the PWM main control module 8. When the present invention is in operation, the AC input terminal 1 contacts AC voltage, the EMI module 2 filters the noise out of the power grid and power supply. The rectifying module 3 and input filter module 4 transform the AC voltage into DC voltage, which flows to the primary and regulated power supply module 93 of transformer. When the regulated power supply module 93 supplies power to the PWM main control module 8, dial segmented dimming module 91 and rotary switch dimming module 92, the overall circuit goes into operation. The light intensity dial switch 912 and power dial switch 913 are used for regulating the light intensity (100%, 60%, 50%, 40%) and power (40 W, 35 W, 30 W, 25 W) respectively. When the dial switch is tuned to 60% light intensity, the wall switch controls 100% and 60% light intensity. In other words, it is 100% light intensity when the wall switch is switched on once, and it is 60% light intensity after the wall switch is switched off and switched on again. The light intensity of the other segments can be implemented so forth. When the power supply is switched, the photoelectric coupling feedback module 94 receives voltage, the photoelectric coupling feedback module 94 gives the PWM main control module 8 a high level, the built-in program of PWM main control module 8 gives a signal to the PWM pin of PWM master control chip in the PWM main control module 8 to control the overall voltage and current output, so that the light intensity is regulated by switching. The light intensity can be regulated by controlling the rotary switch dimming module 92, another dimming method is created, it is convenient to use, so that the present invention has very strong marketability.

The PWM main control module 8 comprises a PWM master control chip 81 and a MOS transistor Q1 as an electronic switch connected to the PWM master control chip 81. The MOS transistor Q1 is connected to the transformer.

The rotary switch dimming module 92 comprises a rotary switch control chip 921 and a rotary switch 922 connected to the rotary switch control chip 921. The rotary switch control chip 921 is connected to the photoelectric coupling feedback module 94.

The current limiting resistance 914 comprises several current limiting resistance resistors connected in parallel.

The regulated power supply module 93 comprises a first transistor Q2, a voltage regulation chip 931, a first diode D2, a second diode D and a Zener diode ZD1. A base of the first transistor Q2 is connected to the Zener diode ZD1. A collector of the first transistor Q2 is connected to the second diode D1 and to a primary coil and PWM main control module 8. The collector of the first transistor Q2 is connected to the voltage regulation chip 931. An emitter of the first transistor Q2 is connected to the first diode D2 and to the PWM main control module 8. The first diode D2 is connected to the Zener diode ZD1 through a charging capacitor CE1. The charging capacitor CE1 is connected to a starting resistor R18 and a starting resistor R17. The starting resistor R17 is connected to the input filter module. The voltage regulation chip 931 is connected to the dial segmented dimming module 91. When the rectifying module 3 and input filter module 4 transform AC voltage into DC voltage, which flows to the primary and regulated power supply module 93 of transformer, and to the starting resistor R18 and starting resistor R17 in the regulated power supply module 93, the starting resistor R18 and starting resistor R17 charge the charging capacitor CE1. When the required starting threshold of PWM master control chip is reached, the MOS transistor Q1 is turned on, the overall circuit goes into operation.

The EMI module 2 comprises a fuse 21 connected to the AC input terminal 1, a first common mode inductor 22 connected to the fuse 21, a second common mode inductor 23 connected to the fuse 21 and an RC loop 24. The RC loop 24 is connected to the rectifying module 3.

The rectifying module 3 has a rectifier bridge chip. The input filter module 4 comprises a capacitor CBB2 and a capacitor CBB1 connected in parallel and an RL loop 41 between the capacitor CBB2 and capacitor CBB1.

The output filter module 6 comprises an electrolytic capacitor EC2, a resistor R23, an electrolytic capacitor EC3 and a resistor R24 connected in parallel and a diode D7 connected to the electrolytic capacitor EC2, a diode D8 connected to both ends of the diode D7 in parallel, a resistor R22 and a capacitor C7 connected to both ends of the diode D7 in parallel, a resistor R21 connected to both ends of the resistor R22 in parallel. The resistor R21 is connected to the transformer 5. The resistor R24 is connected to the DC output terminal 7.

The photoelectric coupling feedback module 94 has a photoelectric coupler.

To sum up, when the present invention is in operation, the AC input terminal 1 contacts AC voltage, the EMI module 2 filters the noise out of the power grid and power supply. The rectifying module 3 and input filter module 4 transform AC voltage into DC voltage, which flows to the primary and regulated power supply module 93 of transformer. When the regulated power supply module 93 supplies power to the PWM main control module 8, dial segmented dimming module 91 and rotary switch dimming module 92, the overall circuit goes into operation. The light intensity dial switch 912 and power dial switch 913 are used for regulating light intensity (100%, 60%, 50%, 40%) and power (40 W, 35 W, 30 W, 25 W) respectively. When the dial switch is tuned to 60% light intensity, the wall switch controls 100% and 60% light intensity. In other words, it is 100% light intensity when the wall switch is switched on once, and it is 60% light intensity when the switch is switched off and switched on again. The light intensity of the other segments can be implemented so forth. When the power supply is switched, the photoelectric coupling feedback module 94 receives voltage, the photoelectric coupling feedback module 94 gives the PWM main control module 8 a high level, the built-in program of PWM main control module 8 gives a signal to the PWM pin of PWM master control chip in the PWM main control module 8 to control the overall voltage and current output, so that the light intensity is regulated by switching, the light intensity can be regulated by controlling the rotary switch dimming module 92, another dimming method is created, it is convenient to use, so that the present invention has very strong marketability.

The embodiments of the present invention do not limit the scope of the present invention, any equivalent changes or modifications according to the present invention shall be covered in the scope of the present invention.

I claim:

1. A dial segmented dimming circuit, comprising
an AC input terminal, an EMI module, a rectifying module, an input filter module, a transformer, an output filter module and a DC output terminal connected in order, and a PWM main control module electrically connected to the transformer and output filter module; wherein the DC output terminal is connected to a LED lamp array module; the AC input terminal is connected to a wall switch, wherein
the dial segmented dimming circuit includes a dial segmented dimming module, a rotary switch dimming module and a regulated power supply module;
the regulated power supply module is connected to the input filter module, primary coil of transformer and dial segmented dimming module;
the rotary switch dimming module is connected to the PWM main control module via a photoelectric coupling feedback module;
the dial segmented dimming module includes a dial switch control chip and a light intensity dial switch and a power dial switch connected to the dial switch control chip;
the light intensity dial switch and the power dial switch are interconnected;
the power dial switch is connected to a current limiting resistance module and to the PWM main control module;
the dial switch control chip is connected to the PWM main control module.

2. The dial segmented dimming circuit defined in claim 1, wherein
the rotary switch dimming module includes a rotary switch control chip and a rotary switch connected to the rotary switch control chip;
the rotary switch control chip is connected to the photoelectric coupling feedback module.

3. The dial segmented dimming circuit defined in claim 1, wherein
the current limiting resistance includes a plurality of current limiting resistance resistors connected in parallel.

4. The dial segmented dimming circuit defined in claim 1, wherein
the regulated power supply module includes a first transistor, a voltage regulation chip, a first diode, a second diode and a Zener diode;
a base of the first transistor is connected to the Zener diode,
a collector of the first transistor is connected to the second diode and to the primary coil of transformer and the PWM main control module;
the collector of the first transistor is connected to the voltage regulation chip;
an emitter of the first transistor is connected to the first diode and to the PWM main control module;
the first diode is connected to the Zener diode ZD1 through a charging capacitor;
the charging capacitor is connected to a first starting resistor and a second starting resistor;
the second starting resistor is connected to the input filter module;
the voltage regulation chip is connected to the dial segmented dimming module.

5. The dial segmented dimming circuit defined in claim 4, wherein
the EMI module includes a fuse connected to the AC input terminal,
a first common mode inductor connected to the fuse,
a second common mode inductor connected to the fuse and
an RC loop; the RC loop is connected to the rectifying module.

6. The dial segmented dimming circuit defined in claim 4, wherein
the rectifying module has a rectifier bridge chip;
the input filter module includes a first capacitor and a second capacitor connected in parallel and an RL loop between the first capacitor CBB2 and second capacitor CBB1.

7. The dial segmented dimming circuit defined in claim 4, wherein
the output filter module includes a first electrolytic capacitor, a first resistor, a second electrolytic capacitor and a second resistor connected in parallel and a third diode connected to the first electrolytic capacitor, a fourth diode connected to both ends of the third diode in parallel, a third resistor and a capacitor connected to both ends of the third diode in parallel, and a fifth resistor connected to both ends of the third resistor in parallel; the fifth resistor is connected to the transformer; the second resistor is connected to the DC output terminal.

8. The dial segmented dimming circuit defined in claim 4, wherein
the photoelectric coupling feedback module has a photoelectric coupler.

9. The dial segmented dimming circuit defined in claim 1, wherein the PWM main control module includes a PWM master control chip and a MOS transistor as electronic switch connected to the PWM master control chip;
the MOS transistor is connected to the transformer.

* * * * *